Figure 1:
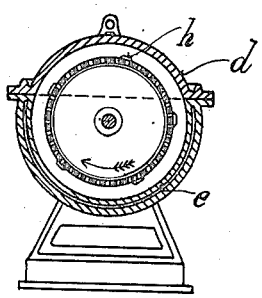

A. BARTELS.
PROCESS FOR TREATING CASEIN.
APPLICATION FILED DEC. 28, 1915. RENEWED AUG. 16, 1916.

1,209,539.

Patented Dec. 19, 1916.

Inventor
A. Bartels.
by
Atty

UNITED STATES PATENT OFFICE.

AMANDUS BARTELS, OF HARBURG-ON-THE-ELBE, GERMANY.

PROCESS FOR TREATING CASEIN.

1,209,539.      Specification of Letters Patent.      Patented Dec. 19, 1916.

Application filed December 28, 1915, Serial No. 69,104. Renewed August 16, 1916. Serial No. 115,334.

*To all whom it may concern:*

Be it known that I, Dr. AMANDUS BARTELS, a subject of the King of Prussia, residing at Buxtehuderstrasse 102, Harburg-on-the-Elbe, in the Kingdom of Prussia, German Empire, have invented certain new and useful Improvements in Processes for Treating Casein, of which the following is a specification.

It has already been proposed to produce transparent horn-like casein masses by first dissolving the casein in caustic alkali, then allowing the solution to settle in order to free it from the particles contained in suspension therein, and then obtaining the casein by precipitation from the resulting clear solution. Although that method is suitable for the production of transparent horn-like masses, yet as the casein is decomposed by the treatment with alkali and consequently loses partly its original properties, in working up the casein to form plastic masses, various drawbacks have been experienced which have not been remedied hitherto. Further, that process entails a great loss of casein. It has hitherto not been possible to produce remuneratively on a large scale such transparent hornlike masses from undecomposed casein.

I have now discovered that undecomposed casein will produce useful and completely transparent casein masses if the casein is first treated in a suitable manner with fat solvents. The selection of such solvents as well as the manner of treating the casein with them, is of extreme importance.

The improved process according to the present invention, now consists in treating dry commercial casein for a considerable time with energetic stirring with an extracting agent while heating and treating the product in the usual manner after drying.

It has already been proposed to deprive casein of its fat by means of fat solvents; it has however been found that a complete deprivation of fat encounters great difficulties. It has been proposed to employ for instance, ether-alcohol as an agent for depriving casein of its fat. On account of the low boiling point of ether however, ether-alcohol can only be employed at ordinary temperatures for removing fat, and in such a case no casein is produced which yields a transparent horn-like mass. What is known as chemically pure casein which has been deprived of its fat according to this ether-alcohol process and which is placed on the market as being completely free from fat, consequently does not produce transparent casein masses.

The problem of readily producing really transparent casein masses on a commercial scale from undecomposed casein has until the advent of the present invention remained unsolved. The applicant has discovered that mixtures of alcohol and benzin or alcohol and benzol are especially suitable for use in effecting a proper preparation of the casein, without changing the quality of the latter. There are of course a large number of other fat-removing agents but their use has always been accompanied with some drawbacks, either because the quality of the casein was deteriorated thereby or because the extracting agent did not penetrate sufficiently deeply into the casein.

The alcohol mixtures of benzin or benzol may be heated to a higher degree than an ether-alcohol mixture without evaporating and as the time required for treatment of the casein is thus considerably diminished, as compared to ether treatment which is operated at normal temperatures, any deleterious effect on the casein due to prolonged treatment is avoided and larger quantities of casein of a better quality are thus produced. The use of ether furthermore, as a solvent, results in the total extraction of fat from the casein, and this is undesirable, as a small quantity at least of fat should remain in the casein, otherwise the casein will not lend itself readily to processes of compression or the like when converting the casein into horny masses for the purpose of making various articles.

In carrying the improved process into practice, it is first ascertained by means of tests how long the treatment of the particular casein with the alcohol mixture must be continued. After having thus ascertained the minimum time for the determined operation, which may under certain circumstances be six hours and sometimes longer, the treatment of the casein is then carried into effect accordingly. The casein is mixed in an extracting vessel in which the mixture is kept energetically stirred while heating, with a sufficient quantity of the alcohol mixture; the solvent in the extracting vessel being renewed from time to time until the completion of the operation. The separated extracting liquid is used after distillation for treating further quantities of casein.

The mixtures of alcohol with benzol or benzin have in this process the particular advantage that the constituents pass over together in the distillation, and the distillate can be used again directly for the same purpose. After having been sufficiently treated with the extracting agent, the casein still moist with the latter, is dried by means of heat and vacuum.

As regards plastic properties, elasticity and workability by tools, the transparent horny mass produced from the casein that has undergone the described preliminary treatment, has exactly the same properties as the mass made from the corresponding commercial casein.

I have further discovered, especially in treating large quantities of casein, that the process can be considerably improved by agitating dry commercial casein with the solvent in a rotating extracting vessel, said solvent being renewed if necessary, whereupon after the discharge of the extracting agent, the casein is heated in the rotating vessel with energetic movement in a vacuum for the purpose of drying and is then treated further in the usual manner to produce artificial masses. This process not only considerably diminishes the requisite duration of the treatment, but it also permits the production of a useful transparent casein mass on a commercial scale by the use of strong alcohol alone.

The success of the above described process is no doubt due above all to the fact that each grain of casein is treated as uniformly as possible and as thoroughly as possible with the extracting agent. Namely, all the grains, even those which resist most to the action of the extracting agent, are treated as thoroughly as possible. A rotatable movement of the vessel for containing the mixture of casein and extracting agent is most desired as any other kind of movement of the vessel for agitating the casein with the extracting agents certainly renders this uniform action of the extracting agent upon each grain of casein much more difficult, perhaps prevents it altogether. Even a few traces of left-over constituents are sufficient to affect the result unfavorably.

A suitable construction of the apparatus for carrying out the improved process of this invention is illustrated by way of example in the accompanying drawings in which:—

Figure 2:
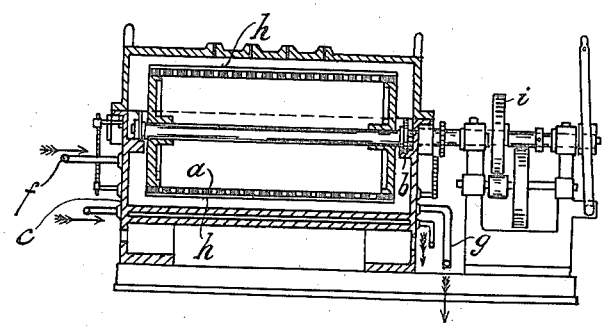

Figure 1 is a cross section and Fig. 2 is a longitudinal section of the apparatus.

The strainer drum $a$ is mounted to rotate in ball bearings $b$ in the lower half $c$ of the liquid-containing cylinder. The upper part $d$ of the cylinder is constructed as a removable cover and allows of effecting a tight closure. The lower part $c$ of the cylinder is provided with a heating jacket $e$ which, if desired, may also be used as a cooling jacket.

The solvent liquid is supplied at $f$ and passes out at $g$. The strainer drum is provided on its periphery with scooping channels $h$ and is rotated by means of driving mechanism $i$. As the strainer drum rotates, the solvent contained in the cylinder $c$ is carried up by the scooping channel $h$, so that the liquid falls back through the straining cylinders into the agitated material which is being subjected to extractive treatment. At the same time however, any solvent which has entered the lower half of the strainer drum, is carried up by the rotation of the drum and is mixed and brought into contact energetically with the material under treatment. A heating or cooling agent is introduced into the jacket $e$ according to requirement.

By reason of the open-topped construction of the mounting and the division of the drum shaft, the strainer drum $a$ can be removed after opening the cylinder cover $d$. The connection of the parts of the divided shaft is effected by means of a suitable coupling. For the purpose of enabling the drum when removed to be rapidly filled and emptied, one end wall of the same is made wholly or partly removable. This arrangement also allows in an extremely simple manner, of utilizing the apparatus as an apparatus for drying the material to be treated, for which purpose drying air is passed through the cylinder and the strainer drum instead of the liquid solvent.

It may be observed for instance that the temperature of the mixture in the extracting vessel may be at 80°–90° centigrade. The vessel is practically filled to $\frac{1}{3}$ or $\frac{1}{2}$.

I claim:

1. A process for treating casein for the purpose specified which consists in heating and agitating a mixture including casein, alcohol and a fat extractive.

2. A process for treating casein for the purpose specified which consists in subjecting a mixture including casein and alcohol to rotative agitation in a heated vessel.

3. A process for treating casein for the purpose specified which consists in agitating and heating a mixture of casein, alcohol and benzol.

4. A process for treating casein for the purpose specified which consists in agitating and heating casein with an alcoholic fat extracting mixture containing benzol.

5. A process for treating casein for the purpose specified which consists in first heating the casein with an alcoholic fat extracting mixture containing benzol in a quickly revolving vessel which is heated to 80 or 90 degrees centigrade, drawing off the extracting agent, and finally drying the casein while still within the rotating vessel.

6. A process for treating casein for the purpose specified which consists in extracting nearly all of the fat therefrom by means of a relatively weak fat extracting mixture in the presence of heat.

7. A process for treating casein for the purpose specified which consists in extracting nearly all of the fat therefrom by means of an alcoholic fat extracting mixture containing benzol in the presence of heat and constant agitation.

8. A process for treating casein for the purpose described which comprises heating and agitating casein with an organic liquid reagent containing a relatively weak fat-extractive.

In testimony whereof I affix my signature in presence of two witnesses.

Dr. AMANDUS BARTELS.

Witnesses:
    FRANCIS R. STEWART,
    LOUIS F. DILGER.